June 23, 1970 D. S. COCHRAN 3,517,199

CONVERTER EMPLOYING A DIODE FOR LOGARITHMICALLY
CONVERTING CURRENT TO VOLTAGE

Filed Oct. 23, 1967

INVENTOR
DAVID S. COCHRAN

BY Roland I. Griffin
ATTORNEY

United States Patent Office 3,517,199

Patented June 23, 1970

3,517,199

CONVERTER EMPLOYING A DIODE FOR LOGARITHMICALLY CONVERTING CURRENT TO VOLTAGE

David S. Cochran, Palo Alto, Calif., assignor to Hewlett-Packard Company, Palo Alto, Calif., a corporation of California Filed Oct. 23, 1967, Ser. No. 677,183
Int. Cl. H01j *39/12*
U.S. Cl. 250—214 6 Claims

ABSTRACT OF THE DISCLOSURE

A diode is connected across the input of an amplifier and in series with a source of variable input current for the amplifier to make the output voltage of the amplifier vary linearly with fractional changes in the input current. The amplifier is A–C coupled to make its output voltage substantially independent of long-term variations in the level of input current and is provided with a nonlinear D–C feedback path to stabilize the baseline of its output voltage.

BACKGROUND AND SUMMARY OF THE INVENTION

This invention relates to an A–C coupled logarithmic converter for linearly converting fractional changes in an input current to an output voltage.

Such a converter may be used, for example, to provide an improved data mark reading device. In conventional data mark reading devices a linear photodiode is typically employed to sense low reflectivity data marks on a relatively high reflectivity card. The reduction in light reflected from the card due to the presence of a less reflective data mark causes a reduction in the current from the photodiode. Generally, smaller reductions in this current may also be caused by erasures, soiled spots, and the like on the card. The photodiode current is also decreased or increased with corresponding changes in, for example, the illumination of the card. Such changes may therefore cause the data mark reading device to indicate an erasure, soiled spot, or the like as being a data mark or vice versa. These errors may be compounded by long-term variations in the photodiode current caused by changes in the light sensitivity of the photodiode with temperature and age.

An improved data mark reading device may be provided by employing the A–C coupled logarithmic converter of the illustrated embodiment of this invention with a linear photodiode. Accordingly, the photodiode is connected to the input of an amplifier and in series with an inexpensive semiconductor diode that is connected across the amplifier. The logarithmic current-voltage characteristic of the inexpensive semiconductor diode makes the output voltage of the amplifier vary linearly with fractional changes in the photodiode current. Thus, the output voltage of the amplifier varies linearly with changes in the reflectivity of the card but does not vary at all with changes in, for example, the illumination of the card. The amplifier is provided with A–C coupling in a series feedback path to make its output voltage substantially independent of long-term D–C variations in the photodiode current and is provided with a D–C feedback path to stabilize the baseline of its output voltage.

DESCRIPTION OF THE PREFERRED EMBODIMENT

Figure 1:
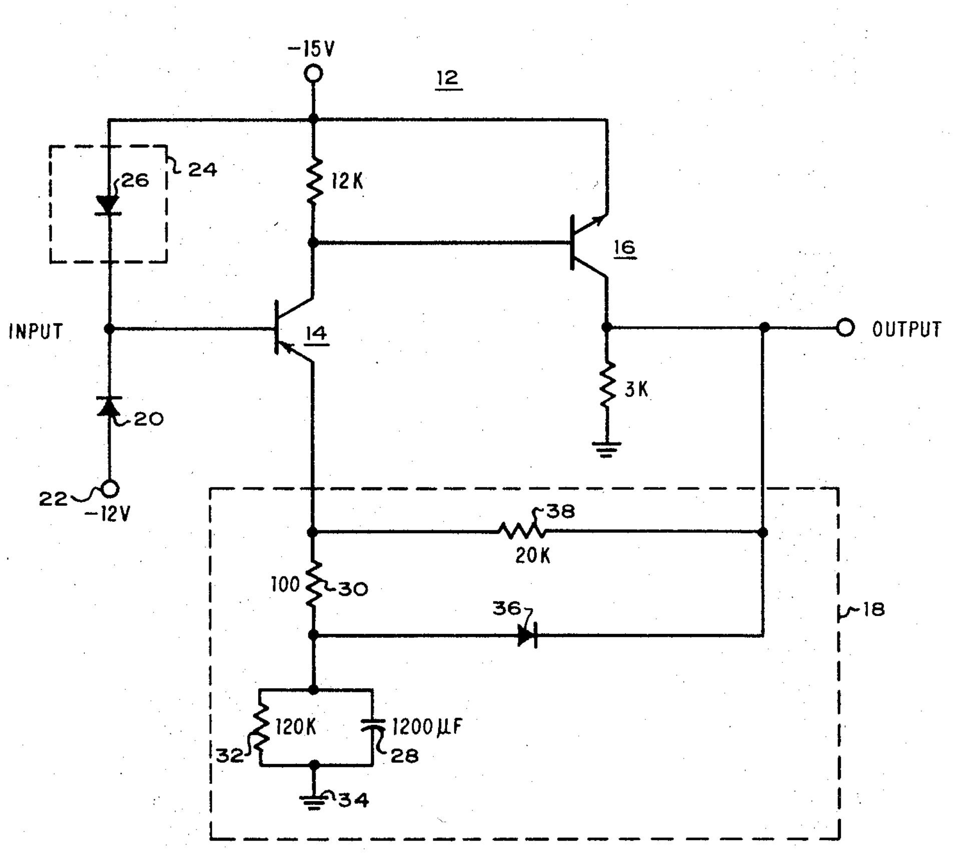
Figure 2A:
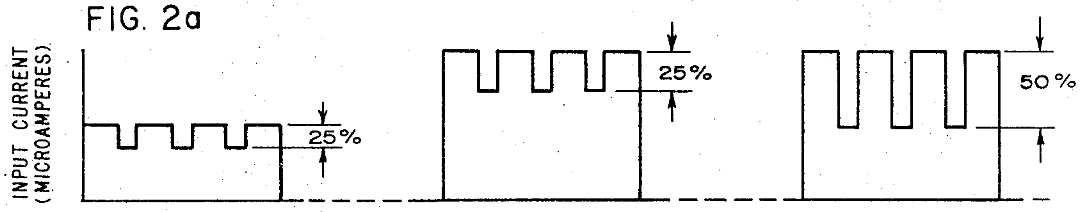
Figure 2B:
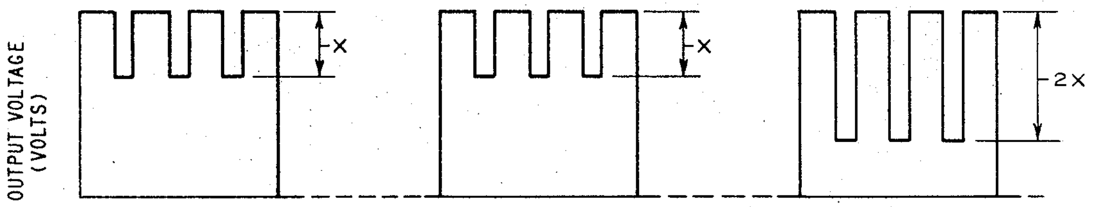

FIG. 1 of the drawing is a schematic diagram of an A C coupled logarithmic converter according to the preferred embodiment of this invention. FIGS. 2*a* and 2*b* of the drawing are waveform diagrams illustrating the relationship between the input current and the output voltage of the converter of FIG. 1.

Referring now to FIG. 1, there is shown an A–C coupled logarithmic converter for converting an input current to an output voltage. The converter includes an A–C coupled amplifier 12 comprising first and second cascaded transistor stages 14 and 16 and a feedback network 18. It also includes an inexpensive semiconductor diode 20 connected between the base of the first transistor stage 14 and a source 22 of negative bias potential. The diode 20 is poled in a direction to be forward biased by the source 22 of negative bias potential. A source 24 of variable input current to be converted is connected to the base of the first transistor stage 14 and is connected in series with the forward-biased diode 20. The source 24 of variable input current may comprise, for example, a linear photodiode 26 of a data mark reading device. The voltage across the diode 20 varies linearly with fractional changes in the input current from source 24 because of the logarithmic current-voltage characteristic of diode 20. This voltage is amplified by amplifier 12 to provide an output voltage at the collector of its second transistor stage 16 that varies linearly with fractional changes in the input current from source 24. Thus, as illustrated in FIG. 2, equal fractional reductions of, for example, twenty-five percent in the input current level from source 24 reduce the output voltage level of amplifier 12 by the same amount even though the amplitude of the reductions in the input current level may vary. Similarly, a fractional reduction of fifty percent in the input current level from source 24 reduces the output voltage level of amplifier 12 by twice as much as a reduction of twenty-five percent in the input current level.

Amplifier 12 is A–C coupled to make its output voltage substantially independent of long-term D–C variations in the input current level from source 24. This A–C coupling is provided by including the coupling capacitor 28 in a series feedback path of the feedback network 18 to facilitate zero baseline restoration. The series feedback path comprises the coupling capacitor 28 shunted by a resistor 32 and connected in series with a resistor 30 between the emitter of the first transistor stage 14 and a source 34 of ground potential. A resistor 38 is connected in the feedback network 18 between the collector of the second transistor stage 16 and the emitter of the first transistor stage 14 to stabilize the gain of the amplifier 12. The feedback network 18 also includes a nonlinear D–C feedback path for stabilizing the baseline of the output voltage of amplifier 12 several orders of magnitude faster than the RC time constant defined by resistor 38 and capacitor 28. This nonlinear D–C feedback path is provided by a diode 36 the anode of which is connected to the collector of the second transistor stage 16 and the cathode of which is connected to the common junction between coupling capacitor 28 and resistors 30 and 32.

I claim:

1. A logarithmic converter for converting an input current to an output voltage, said converter comprising:

an amplifier having an input and an output, said amplifier beig A-C coupled to make the output voltage of the amplifier substantially independent of long-term D-C variations in the input current and including a nonlinear D-C feedback path connected between its input and its output for stabilization of the baseline of its output voltage;

a device having a substantially logarithmic current-voltage characteristic, said device being connected across the input of said amplifier; and means for forward biasing said device to operate within its logarithmic curent-voltage characteristic for conducting the input current to make the output voltage of said amplifier vary substantially linearly with fractional changes in the input current.

2. A logarithmic converter as in claim 1 wherein said device having a substantially logarithmic current-voltage characteristic comprises a semiconductor diode.

3. A logarithmic converter as in claim 2 wherein said amplifier includes a series feedback circuit connected to its input, said series feedback circuit including an A-C coupling capacitor to provide the A-C coupling for the amplifier.

4. A logarithmic converter as in claim 3 including a linear photoresponsive device connected to the input of said amplifier and in series with said semiconductor diode for providing the input current.

5. A logarithmic converter as in claim 4 wherein:

said non-linear D-C feedback path includes another diode; and said series feedback circuit further includes a resistor connected in shunt with said capacitor.

6. A logarithmic converter as in claim 5 wherein:

said amplifier comprises first and second complementary transistor stages connected in cascade;

said first mentioned semiconductor diode is connected across the input of said first transistor stage;

said photoresponsive device is connected to the input of said first transistor stage and in series with said first mentioned semiconductor diode;

said nonlinear D-C feedback path including said last mentioned other diode is connected between the output of said second transistor stage and the input of said first transistor stage;

said series feedback circuit including said capacitor and the resistor connected in shunt therewith is connected to the input of said first transistor stage; and said converter includes another resistor connected in another D.C. feedback path between the output of the second transistor stage and the input of the first transistor stage to stabilize the gain of said amplifier.

References Cited

UNITED STATES PATENTS

| | | | |
|---|---|---|---|
| 3,428,814 | 2/1969 | Doonan | 250—214 |
| 3,461,300 | 8/1969 | Braun | 307—311 X |
| 2,869,044 | 1/1959 | Horwege et al. | 250—214 X |
| 2,927,214 | 1/1960 | Hoffman | 250—214 |
| 2,999,986 | 9/1961 | Holbrook | 330—149 |
| 3,125,693 | 3/1964 | DeClue | 250—214 X |
| 3,189,745 | 6/1965 | Van Roynersdal | 250—214 |
| 3,421,007 | 1/1969 | Schwartz | 250—214 |

ARCHIE R. BORCHELT, Primary Examiner

C. M. LEEDOM, Assistant Examiner

U.S. Cl. X.R.

330—110; 307—142, 311